United States Patent
Yamashita et al.

(10) Patent No.: US 9,138,680 B2
(45) Date of Patent: Sep. 22, 2015

(54) METHOD FOR REMOVING NITROGEN OXIDES

(71) Applicant: Kobe Steel, Ltd., Kobe-shi (JP)

(72) Inventors: Takeshi Yamashita, Kobe (JP); Katsuya Akiyama, Kobe (JP); Noriaki Mizutani, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/353,644

(22) PCT Filed: Nov. 2, 2012

(86) PCT No.: PCT/JP2012/078535
§ 371 (c)(1),
(2) Date: Apr. 23, 2014

(87) PCT Pub. No.: WO2013/065850
PCT Pub. Date: May 10, 2013

(65) Prior Publication Data
US 2014/0286845 A1    Sep. 25, 2014

(30) Foreign Application Priority Data
Nov. 4, 2011    (JP) ................................ 2011-242619

(51) Int. Cl.
*B01D 53/56*    (2006.01)

(52) U.S. Cl.
CPC ........ *B01D 53/56* (2013.01); *B01D 2251/2062* (2013.01); *B01D 2258/0283* (2013.01)

(58) Field of Classification Search
CPC ...................................... B01D 53/56
USPC .......................................................... 423/235
See application file for complete search history.

(56) References Cited

U.S. PATENT DOCUMENTS

| 3,900,554 | A |   | 8/1975  | Lyon |             |
|-----------|---|---|---------|------|-------------|
| 4,129,651 | A | * | 12/1978 | Koike et al. | 423/235 |
| 4,216,060 | A | * | 8/1980  | Murata et al. | 202/139 |
| 4,235,851 | A | * | 11/1980 | Flockenhaus | 423/235 |
| 4,328,020 | A |   | 5/1982  | Hughes |           |
| 4,636,370 | A | * | 1/1987  | Dean et al. | 423/235 |

(Continued)

FOREIGN PATENT DOCUMENTS

| GB | 1388669 A | * | 3/1975 | ............. B01D 53/54 |
| JP | 50 35908  |   | 11/1975 | |

(Continued)

OTHER PUBLICATIONS

Written Opinion of the International Searching Authority Issued Jan. 8, 2013 in PCT/JP12/78535 Filed Nov. 2, 2012.

(Continued)

*Primary Examiner* — Timothy Vanoy
(74) *Attorney, Agent, or Firm* — Oblon, McClelland, Maier & Neustadt, L.L.P.

(57) ABSTRACT

This method for removing nitrogen oxides brings exhaust gas containing oxygen and at least one nitrogen oxide selected from the group consisting of nitrogen monoxide and nitrogen dioxide into contact with ammonia without the presence of a catalyst, for at least 0.5 seconds under a temperature of no less than 900 DEG C., and breaks down the nitrogen oxide. According to this method, it is possible to remove nitrogen oxides in a highly efficient manner and significantly reduce the amount of unreacted ammonia.

16 Claims, 1 Drawing Sheet

(56) References Cited

U.S. PATENT DOCUMENTS

| | | | |
|---|---|---|---|
| 4,693,874 A * | 9/1987 | Hurst | 423/235 |
| 5,820,838 A | 10/1998 | Tsuo et al. | |
| 5,893,940 A | 4/1999 | Tsai | |
| 6,019,068 A | 2/2000 | Tsuo et al. | |
| 8,815,193 B1 * | 8/2014 | Feng et al. | 423/235 |
| 2006/0198779 A1 * | 9/2006 | Hurst et al. | 423/239.1 |

FOREIGN PATENT DOCUMENTS

| | | | | |
|---|---|---|---|---|
| JP | 57 118036 | 7/1982 | | |
| JP | 64 80428 | 3/1989 | | |
| JP | 3 65216 | 3/1991 | | |
| JP | 03065216 A * | 3/1991 | | F23J 15/00 |
| JP | 3 267116 | 11/1991 | | |
| JP | 04341321 A * | 11/1992 | | B01D 53/34 |
| JP | 8 332341 | 12/1996 | | |
| JP | 10 338527 | 12/1998 | | |
| JP | 2000 93741 | 4/2000 | | |
| JP | 2000 505873 | 5/2000 | | |
| JP | 2002 68734 | 3/2002 | | |
| JP | 2008 161759 | 7/2008 | | |
| WO | WO 9819773 A1 * | 5/1998 | | B01D 49/00 |

OTHER PUBLICATIONS

International Search Report Issued Jan. 8, 2013 in PCT/JP12/78535 Filed Nov. 2, 2012.

* cited by examiner

METHOD FOR REMOVING NITROGEN OXIDES

TECHNICAL FIELD

The present invention relates to a method for removing nitrogen oxides, e.g., nitrogen monoxide and nitrogen dioxide, by braking down without the presence of a catalyst.

BACKGROUND ART

Methods for breaking down nitrogen oxides by bringing into contact with ammonia without the presence of a catalyst have been known previously. For example, PTL 1 discloses a method for removing nitrogen oxides in a combustion exhaust gas by bringing the nitrogen oxides in the combustion exhaust gas into contact with ammonia without the presence of a catalyst under a temperature of no less than 800 DEG C. to break down the nitrogen oxides.

CITATION LIST

Patent Literature

PTL 1: Japanese Unexamined Patent Application Publication No. 2002-68734

SUMMARY OF INVENTION

Technical Problem

As disclosed in PTL 1, the method for breaking down nitrogen oxides in an exhaust gas by bringing into contact with ammonia without the presence of a catalyst is widely known. However, a method for removing nitrogen oxides in an exhaust gas more efficiently has been required. The present invention has been made in consideration of the above-described circumstances, and it is an object thereof to provide a method for removing nitrogen oxides without the presence of a catalyst, wherein nitrogen oxides can be removed in a highly efficient manner and the amount of unreacted ammonia can be significantly reduced.

Solution to Problem

A method for removing nitrogen oxides, according to the present invention, which can solve the above-described problems, is characterized by including the step of bringing an exhaust gas containing oxygen and at least one nitrogen oxide selected from the group consisting of nitrogen monoxide and nitrogen dioxide into contact with ammonia without the presence of a catalyst for at least 0.5 seconds under a temperature of no less than 900 DEG C. to break down the above-described nitrogen oxide. According to the method for removing nitrogen oxides of the present invention, nitrogen oxides can be removed in a highly efficient manner and the amount of unreacted ammonia can be reduced significantly.

The upper limit of the temperature at which the above-described exhaust gas is brought into contact with the ammonia is preferably 1,200 DEG C. That is, preferably, the above-described exhaust gas is brought into contact with the ammonia under a temperature of no less than 900 DEG C. and no more than 1,200 DEG C. The utility cost can be reduced by specifying the upper limit of the temperature at which the exhaust gas is brought into contact with the ammonia, as described above.

The molar ratio of the amount of feed of the above-described ammonia to the amount of the above-described nitrogen oxide is preferably no less than 1.0 and no more than 3.0. The amount of unreacted ammonia can be reduced while the removal rate of the nitrogen oxide is increased by adjusting the amount of feed of ammonia, as described above.

Advantageous Effects of Invention

According to the method for removing nitrogen oxides of the present invention, nitrogen oxides can be removed in a highly efficient manner and the amount of unreacted ammonia can be reduced significantly.

DESCRIPTION OF EMBODIMENTS

Figure 1:
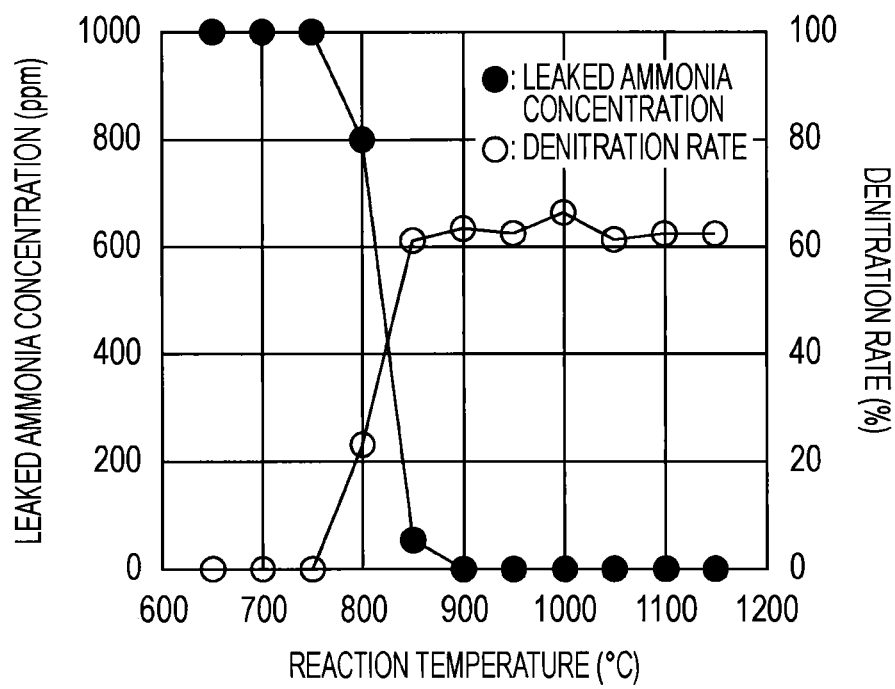
FIG. 1 is a graph showing the relationship of the reaction temperature with the denitration rate and the leaked ammonia concentration.

A method for removing nitrogen oxides according to the present invention is to break down nitrogen oxides by bringing an exhaust gas containing oxygen and nitrogen oxides into contact with ammonia without the presence of a catalyst for at least 0.5 seconds under a temperature of no less than 900 DEG C. Examples of exhaust gases to be treated include gases exhausted from, for example, thermal power plants, refuse incinerators, and furnaces of metal and chemical plants.

For example, as indicated by the reaction formula (1) below, it is believed that a nitrogen oxide (nitrogen monoxide in the reaction formula below) is broken into nitrogen and water by reacting with ammonia and oxygen (denitration reaction).

$$4NO+4NH_3+O_2 \rightarrow 4N_2+6H_2O \tag{1}$$

The nitrogen oxide contained in the exhaust gas serving as a raw material is at least one nitrogen oxide selected from the group consisting of nitrogen monoxide and nitrogen dioxide. It is preferable that 50 volume ppm to 1,000 volume ppm of nitrogen oxide be contained in the exhaust gas, and more preferably 100 volume ppm to 500 volume ppm of nitrogen oxide be contained. In the case where such a concentration of nitrogen oxide is contained in the exhaust gas, the nitrogen oxide in the exhaust gas tends to be broken down favorably.

It is enough that oxygen is present as molecular oxygen in the exhaust gas. In order to break down the nitrogen oxide favorably, it is preferable that 9 to 18 percent by volume of oxygen be contained in the exhaust gas, and more preferably, 11 to 16 percent by volume of oxygen be contained.

Ammonia may be contained in an exhaust gas serving as a raw material, or may be fed separately from the exhaust gas. For example, ammonia may be contained in the exhaust gas in advance, or an exhaust gas containing a nitrogen oxide, oxygen, and ammonia may be fed to a denitration apparatus held at a temperature of no less than 900 DEG C. Alternatively, ammonia may be fed to the denitration apparatus, which is held at a temperature of no less than 900 DEG C., separately from the exhaust gas containing the nitrogen oxide and oxygen. In order to control the denitration reaction easily, preferably, ammonia is fed separately from the exhaust gas containing the nitrogen oxide and oxygen, and more preferably, ammonia is fed to the exhaust gas having a temperature of no less than 900 DEG C. and containing the nitrogen oxide and oxygen.

The amount of feed of ammonia is preferably no less than 1.0 times the amount of nitrogen oxide on a mole basis, more preferably no less than 1.2 times on a mole basis, and further preferably no less than 1.5 times on a mole basis. In the case where the amount of feed of ammonia is no less than 1.0 times the amount of nitrogen oxide on a mole basis, the removal rate of nitrogen oxides (denitration rate) is increased easily. Meanwhile, according to the above-described reaction formula (1), nitrogen monoxide reacts with an equal mole of ammonia, although part of ammonia may react with oxygen (oxidation reaction) in the exhaust gas to be converted to nitrogen oxides. Therefore, it is preferable that the amount of feed of ammonia be excessive relative to the amount of nitrogen oxides. Consequently, the molar ratio of the amount of feed of ammonia to the amount of nitrogen oxide is more preferably no less than 1.2. In this regard, the nitrogen oxides converted from ammonia react with ammonia and, thereby, are broken into nitrogen and water, as shown in the above-described reaction formula (1).

On the other hand, if the amount of feed of ammonia is too large, there is no economy. Therefore, the molar ratio of the amount of feed of ammonia to the amount of nitrogen oxide is preferably no more than 3.0 times, more preferably no more than 2.8, and further preferably no more than 2.5.

Components other than nitrogen oxides and oxygen may be contained in the exhaust gas serving as the raw material. For example, ammonia may be contained, as described above, and nitrogen, carbon dioxide, water vapor, and the like may be contained.

The exhaust gas is brought into contact with ammonia under a temperature of no less than 900 DEG C. for at least 0.5 seconds. Preferably, the exhaust gas is brought into contact with ammonia under a temperature of no less than 900 DEG C. for at least 0.8 seconds. More preferably, the exhaust gas is brought into contact with ammonia for at least 1.0 seconds. In the case where the exhaust gas is brought into contact with ammonia under a temperature of no less than 900 DEG C. for at least 0.5 seconds, the removal rate of nitrogen oxides (denitration rate) increases easily. In this regard, the upper limit of the contact time of the exhaust gas with the ammonia gas under a temperature of no less than 900 DEG C. is not specifically limited. For example, the above-described time may be no more than 10.0 seconds in order that the size of a denitration apparatus does not become too large.

The contact time of the exhaust gas with the ammonia gas under a temperature of no less than 900 DEG C. can be determined as described below, for example. That is, a region which is downstream from the point of feed of the exhaust gas and ammonia in the denitration apparatus and in which the temperature of the atmosphere is no less than 900 DEG C. is determined, and the volume of the region is calculated. Subsequently, the exhaust gas space velocity in the denitration apparatus is determined. Then, the above-described contact time is calculated by dividing the above-described volume by the above-described space velocity. Therefore, in order to increase the contact time of the exhaust gas with the ammonia gas under a temperature of no less than 900 DEG C., the region in which the temperature of the atmosphere is no less than 900 DEG C. in the denitration apparatus may be increased or the exhaust gas space velocity in the denitration apparatus may be reduced.

Meanwhile, in combustion facilities in the related art, in general, an exhaust gas from a furnace is subjected to heat exchange in a boiler and the heat is recovered. In this case, it is believed to be preferable that the exhaust gas be fed to the boiler under a high temperature as much as possible to increase the heat recovery efficiency. Therefore, in the case where the exhaust gas is denitrated without the presence of a catalyst, it is believed to be preferable that the heat held by the exhaust gas be brought into the boiler as much as possible by allowing the exhaust gas to pass through the denitration facilities in minimal time. In consideration of such a point, the retention time of the exhaust gas in the denitration apparatus is minimized in general. Consequently, it can be said that the contact time of the exhaust gas with the ammonia gas under a temperature of no less than 900 DEG C. of at least 0.5 seconds is a relatively long time as compared with that in the related art.

The method for removing nitrogen oxides, according to the present invention, can increase the removal rate of nitrogen oxides (denitration rate) and, in addition, can significantly reduce the amount of unreacted ammonia by bringing the exhaust gas containing nitrogen oxides and oxygen into contact with ammonia under a temperature of no less than 900 DEG C. for at least 0.5 seconds. According to the method for removing nitrogen oxides of the present invention, the amount of unreacted ammonia can be made, for example, less than 1% of the amount of ammonia fed. The reason for this is considered to be that the denitration reaction of nitrogen oxides occurs more promptly as compared with the oxidation reaction of ammonia under a temperature of no less than 900 DEG C. That is, under a temperature of no less than 900 DEG C., the denitration reaction of nitrogen oxides preferentially proceeds, and even when part of ammonia is converted to nitrogen oxides by the oxidation reaction, the resulting nitrogen oxides are broken into nitrogen and water promptly by the denitration reaction. As a result, it is considered that the denitration rate can be increased and the residual ratio of ammonia can be reduced. In this regard, it is more preferable that the exhaust gas be brought into contact with ammonia under a temperature of no less than 925 DEG C. for at least 0.5 seconds. On the other hand, if nitrogen oxides are broken down at a too high temperature, the utility cost increases and there is no economy. Therefore, it is preferable that the exhaust gas be brought into contact with ammonia under a temperature of no more than 1,200 DEG C. for at least 0.5 seconds. The temperature at which the exhaust gas is brought into contact with ammonia is determined by measuring the temperature of the atmosphere in the denitration apparatus.

In consideration of the specification of the denitration apparatus and the exhaust gas treatment condition at present, an iron ore pelletization plant and the like are mentioned as the facilities capable of relatively easily realizing the contact of the exhaust gas containing nitrogen oxides and oxygen with ammonia under a temperature of no less than 900 DEG C. for at least 0.5 seconds. That is, the method for removing nitrogen oxides, according to the present invention, is suitable for the iron ore pelletization plant.

EXAMPLES

The present invention will be described below in further detail with reference to the examples, although the scope of the present invention is not limited to them.

A raw material exhaust gas containing nitrogen monoxide, oxygen, and ammonia was passed through a quartz glass reaction tube set at a predetermined temperature within the range of 650 DEG C. to 1,150 DEG C. and, thereby, nitrogen monoxide was broken down. The raw material exhaust gas contained 1,000 volume ppm of nitrogen monoxide, 15 percent by volume of oxygen, 15 percent by volume of water, ammonia at a predetermined molar ratio to nitrogen monoxide, and the remainder of nitrogen. The predetermined molar ratio of ammonia to the nitrogen monoxide was 0.75, 1.0, or 1.5. Meanwhile, the retention time of the raw material exhaust gas in the reaction tube was adjusted within the range of 0.3 seconds to 2.0 seconds (retention time of the raw material exhaust gas under the normal condition) by changing the flow rate of the raw material exhaust gas. The nitrogen oxide concentration in the outflow gas from the reaction tube was measured with a quadrupole mass spectrometer and the ammonia concentration was measured with a detector tube.

Figure 2:
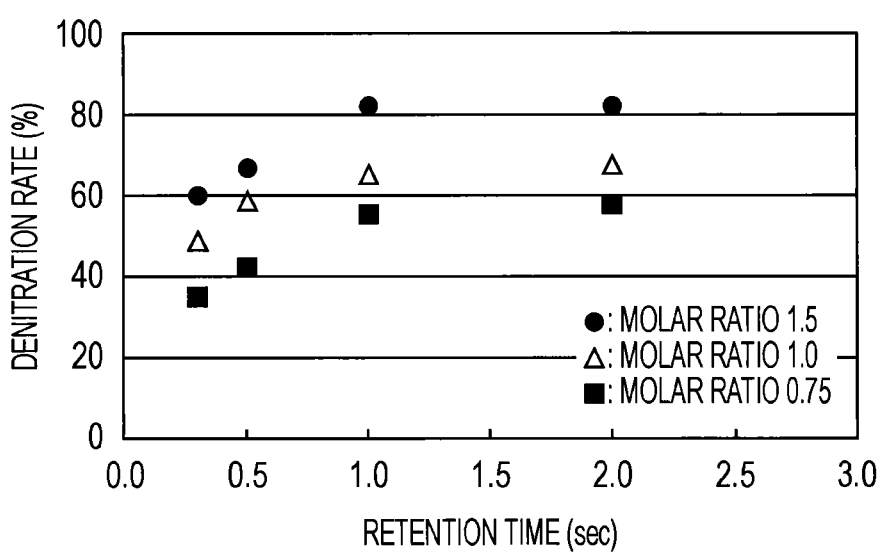
FIG. 2 is a graph showing the relationship of the retention time with the denitration rate, where the amount of feed of ammonia is changed.

The results are shown in FIG. 1 and FIG. 2. FIG. 1 is a graph showing the relationship of the reaction temperature with the denitration rate and the leaked ammonia concentration (concentration of unreacted ammonia). FIG. 1 shows the results under the condition of the retention time of 1 second and the molar ratio (ammonia/nitrogen monoxide) of 1.0. FIG. 2 is a graph showing the relationship of the retention time with the denitration rate, where the amount of feed of ammonia was changed. FIG. 2 shows the results in the case where the reaction temperature was 1,150 DEG C.

As shown in FIG. 1, the denitration rate sharply increases under the reaction temperature of 800 DEG C. to 850 DEG C., and the leaked ammonia concentration can be reduced to nearly 0 ppm under the reaction temperature of no less than 900 DEG C. Also, as shown in FIG. 2, the denitration rate increases as the molar ratio (ammonia/nitrogen monoxide) increases or the retention time increases.

Up to this point, the individual embodiments according to the present invention have been explained. However, the present invention is not limited to the above-described embodiments and can be variously modified and executed on the basis of the description of the claims. This application claims the benefit of Japanese Patent Application (Japanese Patent Application No. 2011-242619) filed on Nov. 4, 2011, which is hereby incorporated by reference herein in its entirety.

INDUSTRIAL APPLICABILITY

The present invention can be applied to a treatment of exhaust gases from, for example, thermal power plants, refuse incinerators, and furnaces of metal and chemical plants.

The invention claimed is:

1. A method for removing at least one nitrogen oxide, the method comprising: contacting an exhaust gas with ammonia; wherein
the exhaust gas comprises oxygen and the at least one nitrogen oxide comprising nitrogen monoxide;
a volume of nitrogen monoxide in the exhaust gas is from 50 ppm-500 ppm; and
the contacting occurs without the presence of a catalyst for at least 0.5 seconds at a temperature of at least 900° C. to break down the at least one nitrogen oxide.

2. The method of claim 1, wherein the contacting occurs at a temperature in a range of 900° C.-1,200° C.

3. The method of claim 1, wherein a molar ratio of ammonia to the at least one nitrogen oxide during the contacting is in a range of 1.0-3.0.

4. The method of claim 1, wherein the at least one nitrogen oxide further comprises nitrogen dioxide.

5. The method of claim 4, wherein the contacting occurs at a temperature in a range of 900° C.-1,200° C.

6. The method of claim 4, wherein a molar ratio of ammonia to the at least one nitrogen oxide during the contacting is in a range of 1.0-3.0.

7. The method of claim 4, wherein the exhaust gas comprises oxygen at a concentration of from 9-18% by volume.

8. The method of claim 4, wherein the exhaust gas further comprises nitrogen, carbon dioxide, and water vapor.

9. The method of claim 1, wherein the exhaust gas comprises oxygen at a concentration of from 9-18% by volume.

10. The method of claim 1, wherein the exhaust gas comprises oxygen at a concentration of from 11-16% by volume.

11. The method of claim 1, wherein a molar ratio of ammonia to the at least one nitrogen oxide during the contacting is in a range of 1.2-2.8.

12. The method of claim 1, wherein a molar ratio of ammonia to the at least one nitrogen oxide during the contacting is in a range of 1.5-2.8.

13. The method of claim 1, wherein the exhaust gas further comprises nitrogen, carbon dioxide, and water vapor.

14. The method of claim 1, wherein the contacting occurs without the presence of a catalyst for 0.8-10.0 seconds at a temperature of at least 900° C. to break down the at least one nitrogen oxide.

15. The method of claim 1, wherein the contacting occurs without the presence of a catalyst for 1.0-10.0 seconds at a temperature of at least 900° C. to break down the at least one nitrogen oxide.

16. The method of claim 1, wherein the contacting occurs at a temperature in a range of 925° C.-1,200° C.

* * * * *